United States Patent [19]

Huang et al.

[11] 3,961,835

[45] June 8, 1976

[54] ELASTIC RETAINING CLIP

[75] Inventors: Pao C. Huang, Towson; John C. Matra, Jr., Cockeysville, both of Md.

[73] Assignee: The United States of America as represented by the Secretary of the Navy, Washington, D.C.

[22] Filed: Jan. 28, 1975

[21] Appl. No.: 544,714

[52] U.S. Cl. .............................................. 339/260
[51] Int. Cl.² ......................................... H01R 9/12
[58] Field of Search ............ 339/261, 262, 278, 260

[56] References Cited
UNITED STATES PATENTS

| | | | |
|---|---|---|---|
| 1,273,250 | 7/1918 | Luxmore | 339/260 |
| 1,552,154 | 9/1925 | Hatfield | 339/261 |
| 1,585,840 | 5/1926 | Fahnestock | 339/260 |
| 3,812,445 | 5/1974 | Stelani | 339/32 R |

*Primary Examiner*—Joseph H. McGlynn
*Attorney, Agent, or Firm*—R. S. Sciascia; J. A. Cooke; F. K. Yee

[57] ABSTRACT

A retaining clip capable of repeated, reliable application of a high retention force on an elongated member, such as an arming wire, having a planar base portion with ends formed into upstanding, reversed S-shaped bends. The upper bend of one S-shape has a reduced width portion receivable in an aperture provided in the upper bend of the other S-shape. Stop means are provided on the reduced width portion which engage the sides of the aperture to restrict displacements to the elastic-range of the heat-treated material of the clip.

4 Claims, 8 Drawing Figures

ELASTIC RETAINING CLIP

BACKGROUND OF THE INVENTION

Requirements exist for a retaining clip or fastener of small size which is capable of reliably and repeatedly exerting a high, holding force. A particular embodiment of these requirements is the arming wire retaining clips used in fuzes of aerial-delivered ordnances wherein a wire is passed through the fuze to maintain a safe, unarmed condition. To prevent the wire from being inadvertently removed, retaining clips are placed upon the wire on both sides of the fuze. These clips must exert a high, gripping force to preclude removal during normal ordnance handling and aircraft maneuvers. Furthermore, in the event that the clips are removed and reused, for example, when ordnance items are loaded but not deployed and are subsequently reloaded, the clips must exert the same, consistent high retaining force without structural failure. The requirements of small clip size plus a consistent, repeatable and reliable applied load are necessary to assure a fail-safe and operable fuze. The clip must be able to apply a load of 75 to 100 pounds on the arming wire, which is equivalent to 25 to 50 pounds of pull on the wire to remove it from the clip. Additionally, the clip must be small to minimize wind resistance. Furthermore, from reliability and safety considerations, the load applied by the clip must be repeatable with a high level of assurance.

Some currently-used clips are a variation of the brass Fahnestock clips. This clip was designed so that a pull of 20 to 30 lbs. would remove the arming wire. However, with this design, compression of the clip to its mechanical stop results in stresses well above the elastic limit of the material. Therefore, if the clip were compressed and the released, the original and final, no-load position would not be the same. The resulting permanent set causes a reduction in the force applied to the arming wire, resulting in a reduction of the pull force required to remove the arming wire from the retaining clip. This reduction is not constant but dependent upon the amount of permanent set, the actual stresses and the material yield strength resulting from heat treatment. It is anticipated that the reduction of wire pull load could be as much as one-third of the original load, raising the question of the reliability and repeatability of this clip.

Due to the severity of the bends, the inability to completely deburr the Fahnestock clip and the fact that the clip is worked far beyond the material's elastic limit inherently makes this design susceptible to stress corrosion and subsequent failures. In addition, at the root of the hook which serves as a catch to secure the arming wire, a critical condition of stress concentration will occur, invariably shortening the life of the clip by stress corrosion and ultimate failure.

An alternate design of the above-described Fahnestock clip is the beryllium-copper scissor clip from which wire pull loads of 20 to 25 lbs. can be obtained. As with the above clip, the maximum, sustained stresses are beyond the elastic limit, resulting in the clip being permanently deformed. Again, this deformation, or set, alters the loading applied to the wire by the clip which in turn affects the reliability and repeatability of the clip in use.

SUMMARY OF THE INVENTION

It is therefore an object of the present invention to provide a new and improved retaining clip.

Another object of the invention is to provide a new and improved retaining clip that is small-sized and still capable of exerting high, holding forces.

Another object of the invention is to provide an improved, small-sized retaining clip capable of exerting high holding forces repeatedly and reliably.

Still another object of the invention is the provision of an improved retaining clip of small size capable of yielding a designed, wire pull force repeatedly and reliably.

A further object of the invention is the provision of an improved retaining clip that is durable and not subject to stress corrosion.

A still further object of the invention is to provide an improved retaining clip of small size having completely elastic displacements.

Briefly, in accordance with one embodiment of this invention, these and other objects are attained by providing a retaining clip comprising an elongated, flat, treated, metal band formed to have a base and two, arcuate leg portions with opposed, reverse bends. The reverse bend of one leg has a portion of reduced width which is received within a rectangular cut-out in the reverse bend of the other leg. This design enables the clip to flex only within its elastic limit and precludes plastic deformation, thus providing a clip of small size which is capable of reliably and repeatedly achieving its relatively high, designed, clamping force.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
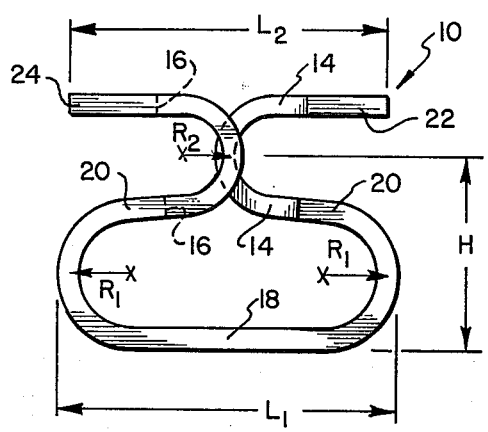
FIG. 1 is a side elevational view of the retaining clip in the free, unstrained position.
Figure 3:
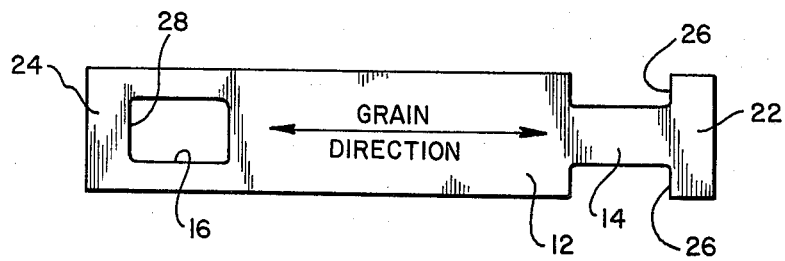
FIG. 3 is a plan view of the flat pattern of the clip.

Referring now to the drawings wherein like reference characters designate identical or corresponding parts throughout the several views and more particularly to FIG. 1 thereof, the improved retaining clip 10 of the present invention is shown in its free and unstressed position. As shown in FIG. 3, the clip 10 is formed from a strip 12 of metal of suitable composition and heat treatment. Approximate one end of strip 12 is a portion 14 of reduced width having the inner corners thereof rounded with radius curves of appropriate size to eliminate stress concentrations.

Approximate the other end of metal strip 12 is a cut-out 16 which receives reduced-width portion 14 and cooperates therewith to provide mechanical stops to limit the permissible deflection of the clip, as well be more fully described hereinafter.

Strip 12 is fabricated from suitable material, such as by punching, formed into the clip shape of FIG. 1 and appropriately heat treated. As can be seen in FIG. 1, the clip is shaped to have a substantially planar base portion 18 terminated at both ends with upstanding, S-shaped, arcuate leg portions 20 having opposed, reverse bends. The ends 22 and 24 of strip 12 forming the upper portion of the S-bends are formed to be substantially parallel to base portion 18.

Figure 2:
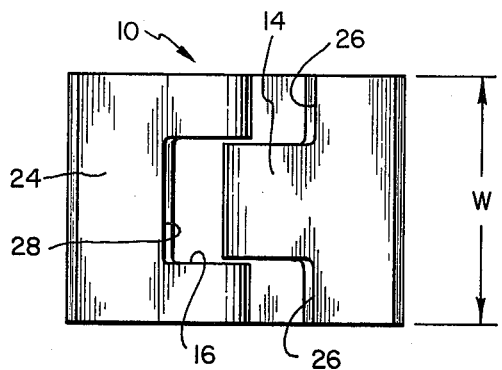
FIG. 2 is a top view of the clip of FIG. 1.
Figure 4:
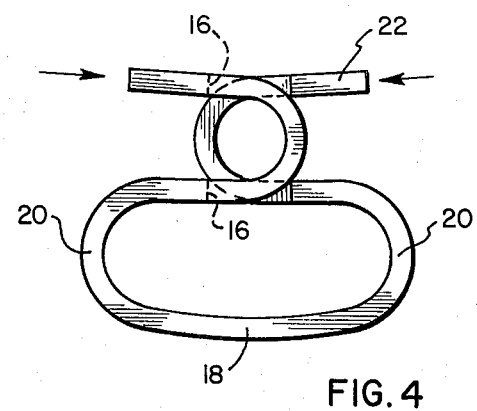
FIG. 4 shows the clip displaced to its stop limits to receive the wire.
Figure 5:
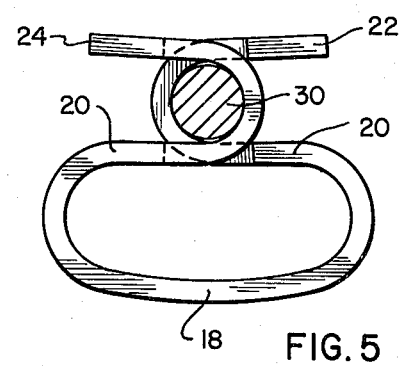
FIG. 5 shows the clip in the wire-retaining position.
Figure 6:
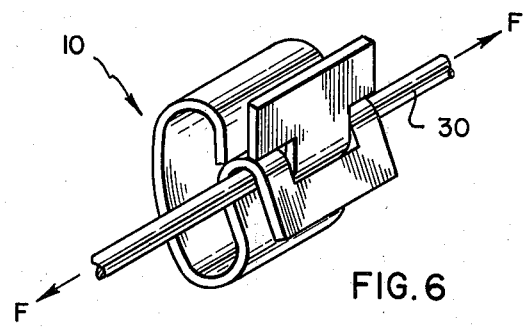
FIG. 6 is a perspective view of FIG. 5.

Those portions of strip 12 wherein reduced-width portion 14 and cutout 16 are provided are curved to form the upper arcuate bend of clip 10 such that portion 14 is received within cutout 16. This is shown more clearly in FIG. 2, a plan view of clip 10. It can be seen that when a displacement force is suitably applied to ends 22 and 24, portion 14 moves within cut-out 16 to the limit determined by the lateral sides 26 of portion 14 abutting against side 28 of cutout 16. FIG. 4 shows this stressed, or maximally-compressed, position of clip 10 in elevational perspective. This cooperative stoppage ensures that stresses in clip 10 are maintained within the elastic limit. Upon release of the displacement forces, clip 10 naturally tends to resume the unstressed position in FIG. 1. With clip 10 positioned upon a wire 30 (FIGS. 5 and 6), a high retaining force, for example, of 70-100 lbs., will be exerted upon the wire, resulting in approximately 35 lbs. of force F necessary to remove wire 30 from the clip (FIG. 6).

Figure 7:
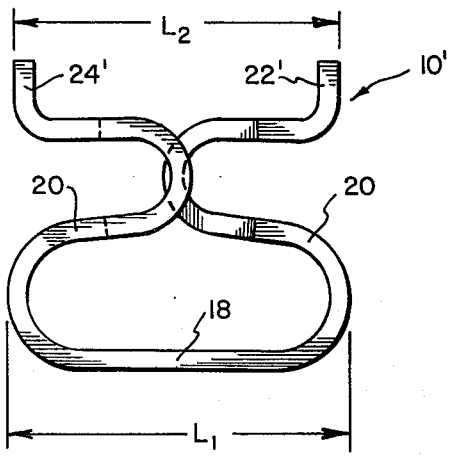
FIG. 7 is another embodiment of the invention.

FIG. 7 illustrates an alternative embodiment of the invention. End portions 22' and 24', rather than being formed parallel to bases portion 18, as in FIGS. 1, 4 and 5, are upstanding and substantially perpendicular to base portion 18. This configuration provides a somewhat larger surface area to grip the clip when applying it to a wire and requires somewhat less force to compress the clip to the full-stop position of FIG. 4. In all other respects, the clip 10' is identical to clip 10.

The grain of the material is oriented along the length of strip 14, as shown in FIG. 3. The length, the width relative to the width of strip 12 and the location of reduced-width portion 14, as well as the length, width and location of cutout 16 are determined by the required, designed holding force to be exerted by the clip, clip size, the material and heat treatment of the clip. Other design variables include the clip width, W (FIG. 2); height, H, from the base portion 18 to the centerline of the upper bend (FIG. 1); the radius $R_1$ and $R_2$ of the lower and upper S-shaped bends, respectively; and clip lengths, $L_1$ and $L_2$, of the base and upper portions, respectively (FIGS. 1 and 7).

Figure 8:
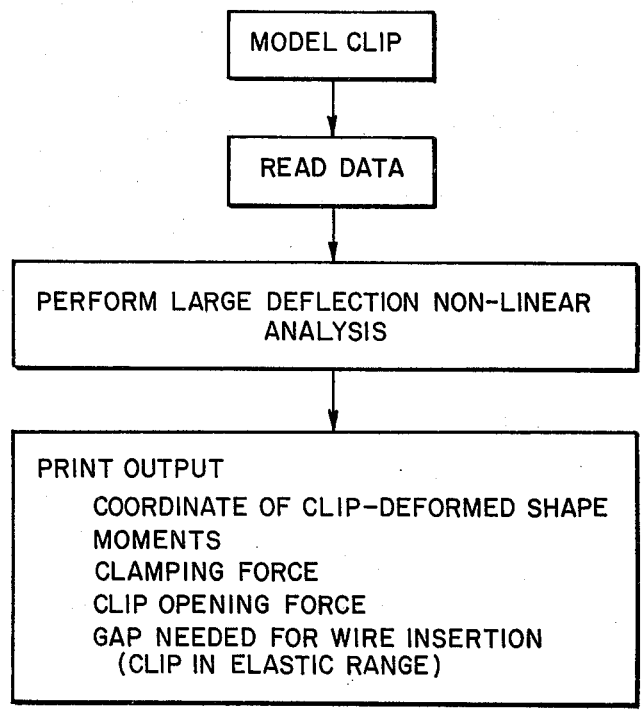
FIG. 8 is a flow chart of the computer program for designing the clip.

The design parameters, obviously, are subject to numerous variations and combinations. To optimize these parameters and to ensure elastic deformations, a digital computer program was developed based upon an elastic, large-deflection, non-linear analysis. FIG. 8 is a functional flow of the program and the Appendix contains a listing of the program and an input for an example clip. In FIG. 8 the function block entitled "Model Clip" is the generation of the necessary known variables for the clip, such as thickness (T), base length (L), clip width (W1), yield strength (F7) of the material, and X- and Y-coordinates on the clip for which computations are to be made.

Obviously numerous modifications and variations of the present invention are possible in light of the above teachings. It is therefore to be understood that, within the scope of the appended claims, the invention may be practiced otherwise than as specifically described.

APPENDIX

ELASTIC RETAINING CLIP PROGRAM LISTING

```
1   PRINT " ARMING SAFETY CLIP "
2   PRINT " CALCULATIØNS ØF LØAD MØMENTS AND DEFLECTIØNS "
3   PRINT "  "
8   PRINT "  "
10  DIM X(50),Y(50),A(50),B(50),M(50),U(50),V(50)
15  READ N,N1,N2,N3,N4,N5,T,VO,L,Z1,Z2
17  READ D,W1,W2,W3,W4,W5,E,J1,J2
20  PRINT " CLIP THICKNESS =",T,"NØ. ØF SEGMENTS =",N
27  LET N7 = N + 1
30  FØR I = 1 TØ N7
35  READ X(I),Y(I)
37  NEXT I
38  LET J7 = 0
39  LET V2 = 0
40  LET B3 = (T + 3)/12
42  LET I1 = B3*W1
43  LET I2 = B3*W2
44  LET I3 = B3*W3
46  LET I4 = B3*W4
47  LET I5 = B3*W5
48  READ F7
```

-continued

```
49   PRINT " WIDTH ØF CLIP = "W1," YIELD STRENGTH = "F7
50   LET F1 = F7*2*I3/T
51   LET R1 = 0
52   PRINT " LØAD REACTED AT PØINTS:"J1,"AND" J2
53   PRINT " "
57   LET VT = T+D
58   LET Y1 = Y(Z1)
59   LET Y2 = Y(Z2)
60   FØR I = 1 TØ N7
65   LET A(I) = 0
67   LET B(I) = 0
76   FØR J = J1 TØ J2
77   IF (J-(N1+1))< = 0 THEN 79
78    GØ TØ 81
79    LET I7 = I1
80    GØ TØ 95
81   IF (J-(N1+N2+1)) < = 0 THEN 83
82    GØ TØ 85
83    LET I7 = I2
84    GØ TØ 95
85   IF (J-(N1+N2+N3)) < = 0 THEN 87
86    GØ TØ 89
87    LET I7 = I3
88    GØ TØ 95
89   IF (J-(N-N5)) < 0 THEN 91
90    GØ TØ 93
91    LET I7 = I4
92    GØ TØ 95
93    LET I7 = I5
95   LET A1 = (X(J)-X(J1))*(X(I)-X(J2))*Y(J1)-Y(J))/(Y(J1)-Y(J2))
97   LET B1 = (X(J)-X(J1))*(Y(I)-Y(J2))*(Y(J)-Y(J1))/(Y(J1)-Y(J2))
100  IF I > J2 THEN 120
102  IF I > J1 THEN 106
104  GØ TØ 108
106  IF J < I+1 THEN 120
108  LET A1 = A1 + (X(J)-X(I))*(X(J)-Z(J1))
110  LET B1 = B1 + (Y(I)-Y(J))*(X(J)-X(J1))
120  LET A(I) = A(I) + A1/I7
122  LET B(I) = B(I) + B1/I7
124  NEXT J
126  NEXT I
152  FØR I = 1 TØ N7
155  LET V(I) = A(I)*VO/A(J1)
157  LET U(I) = B(I)*VO/A(J1)
158  NEXT I
159  FØR I = 1 TØ N7
160  LET X(I) = Z(I) + U(I)
162  LET Y(I) = Y(I) + V(I)
```

```
163  NEXT I
164  LET R1 = R1 + E*V0/(L*A(J1))
165  LET V2 = V2 + V0
167  PRINT " V2 = "V2
170  IF (Y(Z1)-Y(Z2))>0 THEN 60
172  LET Y3 = Y(Z2)-Y(Z1)
173  IF Y3 < 1E-8 THEN 159
174  IF ABS(V7-Y3) < 1E-8 THEN 200
175  IF (V7-Y3) > 0 THEN 60
177  IF J7 = 1 THEN 200
180  FØR I = 1 TØ N7
187  LET X(I) = X(I) - U(I)
190  LET Y(I) = Y(I) - V(I)
191  NEXT I
192  LET R1 = R1 - E*V0/(L*A(J1))
193  LET V2 = V2-V0
194  LET J7 = 1
195  LET V0 = V0/10
197  GØ TØ 60

200  LET R = R1
201  FØR I=1 TØ N7
202  IF I > J1 THEN 207
205  GØ TØ 217
207  IF I < J2 THEN 212
210  GØ TØ 217
212  LET M(I) = R*(X(I)-X(J1))
215  GØ TØ 220
217  LET M(I) = 0
220  NEXT I
224  PRINT " "
225  PRINT "   I"," M"," X*100 ","  T*100 "
227  PRINT " "
230  FØR I = 1 TØ N7
232  PRINT "  "I," "M(I),"  "X(I)*100,"  "Y(I)*100
235  NEXT I
237  PRINT " "
240  PRINT " LØADING AT PØINTS"J1,"AND " J2
242  PRINT " R = "R
243  PRINT " "
250  PRINT " ELASTIC RESISTING MØMENT AT PØINT 13 = "F1
300  DATA 24,2,4,12,4,2
301  DATA .033,-.0298
302  DATA .105,5,21
303  DATA .064
304  DATA .65,.30,.65,.30,.65,30E6
305  DATA 5,21
306  DATA 0,.35..1,.315,.11,.21,.11,.105
307  DATA .19,.026
```

-continued
```
308  DATA .27,.095,.315,.19,.36,.285,.45,.35,.545,.30,.56,.21
309  DATA .56,.105,.56,0,.56,-.105,.56,-.21,.545,-.30,.45,-.35
310  DATA .36,-.285,.315-.19,.27,-.095
311  DATA .19,-.026
312  DATA .11,-.105,.11,-.21,.1,-.315,0,-.35
314  DATA 230000
400  END
```
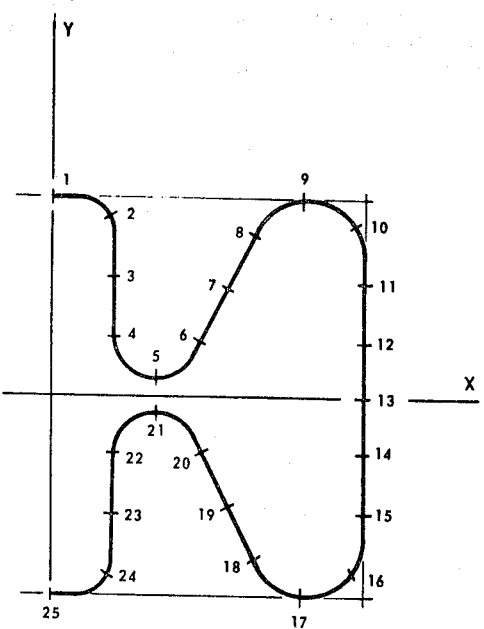
EXAMPLE INPUT DATA
| PT | X | Y |
|----|------|-------|
| 1  | 0    | .35   |
| 2  | .1   | .315  |
| 3  | .11  | .21   |
| 4  | .11  | .105  |
| 5  | .19  | .03   |
| 6  | .27  | .095  |
| 7  | .315 | .19   |
| 8  | .360 | .285  |
| 9  | .45  | .35   |
| 10 | .545 | .30   |
| 11 | .56  | .21   |
| 12 | .56  | .105  |
| 13 | .56  | 0     |
| 14 | .56  | -.105 |
| 15 | .56  | -.21  |
| 16 | .545 | -.30  |
| 17 | .45  | -.35  |
| 18 | .360 | -.285 |
| 19 | .315 | -.19  |
| 20 | .27  | -.095 |
| 21 | .19  | -.03  |
| 22 | .11  | -.105 |
| 23 | .11  | -.21  |
| 24 | .1   | -.315 |
| 25 | 0    | -.35  |
$N = 24$
$N1 = 2$
$N2 = 4$
$N3 = 12$
$N4 = 4$
$N5 = 2$
$T = .04$
$L = .105$
$Z1 = 5$
$Z2 = 21$
$D = .064$
$W1 = .55$
$W2 = .25$
$W3 = .55$
$W4 = .25$
$W5 = .55$
$V0 = -.0328$
$J1 = 5$
$J2 = 21$
$F7 = 230000$

What is claimed as new and desired to be secured by Letters Patent of the United States is:

1. An elastic fastening device capable of repeatedly applying a consistent holding force comprising:
   a substantially flat, planar base portion;
   a pair of upstanding, arcuate leg portions having opposed, reversed, S-shaped bends formed therein, the end portion of each of the upper bends being substantially parallel to said base portion and the radius of curvature of the lower bend being larger than the radius of curvature of the upper bend;
   an aperture in the upper bend of one leg portion;
   a reduced-width portion in the upper bend of the other leg portion receivable in said aperture; and
   lateral extensions on said reduced-width portion co-operating with said aperture to limit the displacement of said reduced-width portion within said aperture to the elastic range of the material of said fastening device,
   whereby said reduced-width portion is displaceable within said aperture to receive therein the means to be fastened.

2. The device of claim 1 wherein the upper end of each of said S-shaped leg portions further comprises vertically-extending tabs, substantially perpendicular to said base portion.

3. The method of forming an elastic device capable of repeatedly applying a consistent holding force comprising the steps of:
   a. forming in a strip of heat-treated material an aperture approximate one end and a reduced-width portion approximate the other end;
   b. providing lateral extensions on said reduced-width portion;
   c. deforming said material into a form having two, reversed, substantially S-shaped bends at the ends of a planar base portion, the radius of curvature of the lower bends being larger than the radius of curvature of the upper bends, including bending the end portions into the upper bend of an S-shape;
   d. orienting the bends so formed such that the reduced-width portion is positioned within the aperture and said lateral extensions will coact with said aperture to provide stop means for said reduced-width portion to limit the displacement thereof to the elastic range of the material; and
   c. positioning the end portions of said material substantially parallel to the planar base portion.

4. The method of claim 3 further comprising the step of providing the end portions of said material with extensions substantially perpendicular to the planar base portion.

* * * * *

PO-1050
(5/69)

UNITED STATES PATENT OFFICE
CERTIFICATE OF CORRECTION

Patent No. 3,961,835                           Dated June 8, 1976

Inventor(s) Pao C. Huang and John P. Matra, Jr.

It is certified that error appears in the above-identified patent and that said Letters Patent are hereby corrected as shown below:

Change the name John C. Matra, Jr. to

John P. Matra, Jr.

Signed and Sealed this

Fifth Day of October 1976

[SEAL]

Attest:

RUTH C. MASON
*Attesting Officer*

C. MARSHALL DANN
*Commissioner of Patents and Trademarks*